(12) United States Patent
Dong et al.

(10) Patent No.: US 9,031,273 B2
(45) Date of Patent: *May 12, 2015

(54) WEARABLE COMPUTING DEVICE WITH BEHIND-EAR BONE-CONDUCTION SPEAKER

(71) Applicant: Google Inc., Mountain View, CA (US)

(72) Inventors: Jianchun Dong, Palo Alto, CA (US); Mitchell Heinrich, San Francisco, CA (US); Leng Ooi, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,785

(22) Filed: Sep. 16, 2013

(65) Prior Publication Data

US 2014/0016800 A1    Jan. 16, 2014

Related U.S. Application Data

(63) Continuation of application No. 13/299,201, filed on Nov. 17, 2011, now Pat. No. 8,553,910.

(51) Int. Cl.
*H04R 25/00* (2006.01)
*H04R 1/02* (2006.01)
(Continued)

(52) U.S. Cl.
CPC ............ *H04R 1/028* (2013.01); *G02B 27/02* (2013.01); *G02B 27/017* (2013.01);
(Continued)

(58) Field of Classification Search
CPC ............. H04R 2460/13; H04R 5/0335; H04R 1/1066; H04R 2420/07; H04R 1/1041; H04R 1/1025; H04R 1/1083; H04R 25/606; H04R 25/00; H04R 2201/103; H04R 1/1016; H04R 1/105; H04R 2201/107; H04R 25/70; H04R 5/023; H04R 1/1075

USPC .................. 381/151, 380, 326, 327; 151/158; 455/347

See application file for complete search history.

(56) References Cited

U.S. PATENT DOCUMENTS 5,606,743 A * 2/1997 Vogt et al. ...................... 455/347
2009/0060231 A1   3/2009 Buroojy
2011/0158443 A1   6/2011 Asnes

FOREIGN PATENT DOCUMENTS

EP      1967893       9/2008
JP      2005151292    6/2005
WO      2008145949    12/2008

OTHER PUBLICATIONS

Bruckhoff, Hearing Spectacles La Belle BC, available online at: http://www.bruckhoff.com/en/products/bone_conduction_instruments/la_belle_bc (last visited Nov. 15, 2011).

*Primary Examiner* — Davetta W Goins
*Assistant Examiner* — Phylesha Dabney
(74) *Attorney, Agent, or Firm* — McDonnell Boehnen Hulbert & Berghoff LLP (57) ABSTRACT

Apparatuses that provide a bone-conduction speaker arranged to be located behind the ear are described herein. An exemplary apparatus may include: (a) a glasses-style support structure comprising a front section and at least one side section; (b) at least one bone-conduction speaker; and (c) a member having a proximate end and a distal end, wherein the proximate end is attached to the at least one side section, and wherein the at least one bone-conduction speaker is attached to the member at or near the distal end; wherein the member is arranged on the at least one side section such that when the glasses-style support structure is worn the member: (a) extends to the anterior of the at least one side section and (b) locates the bone-conduction speaker posterior to an ear.

20 Claims, 6 Drawing Sheets

(51) Int. Cl.
  *G02B 27/02* (2006.01)
  *G02C 11/00* (2006.01)
  *H04R 1/10* (2006.01)
  *G02B 27/01* (2006.01)
  *H04R 5/033* (2006.01)
  *H04R 5/04* (2006.01)

(52) U.S. Cl.
  CPC .... *G02B 2027/0178* (2013.01); *G02B 27/0176* (2013.01); *H04R 2460/13* (2013.01); *H04R 2499/11* (2013.01); *G02C 11/10* (2013.01); *H04R 1/1066* (2013.01); *H04R 1/1075* (2013.01); *H04R 5/0335* (2013.01); *H04R 5/04* (2013.01); *H04R 2201/103* (2013.01); *H04R 2201/107* (2013.01)

FIGURE 5

WEARABLE COMPUTING DEVICE WITH BEHIND-EAR BONE-CONDUCTION SPEAKER

RELATED APPLICATION

This patent application claims priority to U.S. application Ser. No. 13/299,201, filed on Nov. 17, 2011, the contents of which are entirely incorporated herein by reference, as if fully set forth in this application.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

SUMMARY

In one aspect, an exemplary apparatus may include: (i) a glasses-style support structure comprising a front section and at least one side section; (ii) at least one bone-conduction speaker; and (iii) a member having a proximate end and a distal end, wherein the proximate end is attached to the at least one side section, and wherein the at least one bone-conduction speaker is attached to the member at or near the distal end; wherein the member is arranged on the at least one side section such that when the glasses-style support structure is worn the member: (a) extends to the anterior of the at least one side section and (b) locates the bone-conduction speaker posterior to an ear.

In another aspect, an exemplary apparatus may include: (i) at least one bone-conduction speaker; and (ii) a member having a proximate end and a distal end, wherein the proximate end comprises an attachment feature that is configured to attach to a side section of a glasses-style support structure, and wherein the at least one bone-conduction speaker is attached to the member at or near the distal end; wherein the member is attachable to the side section such that when the glasses-style support structure is worn the member: (a) extends to the anterior of the at least one side section and (b) locates the bone-conduction speaker posterior to an ear.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

An exemplary embodiment may be implemented in a wearable computer having a head-mounted display (HMD), or more generally, may be implemented on any type of device having a glasses-like form factor. Further, an exemplary embodiment involves an ear-piece with a bone-conduction speaker (e.g., a vibration transducer). The ear-piece is attached to a glasses-style support structure, such that when the support structure is worn, the ear-piece extends from the support structure to contact the bone-conduction speaker to the back of the wearer's ear. For instance, the ear-piece may be located on the hook-like section of a side arm, which extends behind a wearer's ear and helps keep the glasses in place. Accordingly, the ear-piece may extend from the side arm to contact the back of the wearer's ear at the auricle, for instance.

In another aspect, the ear-piece may be spring-loaded so that the bone-conduction speaker fits comfortably and securely against the back of the wearer's ear. For instance, the ear-piece may include an extendable member, which is connected to the glasses on one end and is connected to the bone-conduction speaker on the other end. A spring mechanism may accordingly serve to hold the end of the member having the bone conduction away from side-arm when the glasses are not being worn. Further, the spring mechanism may hold the member in a position such that when a wearer puts the glasses on, the back of a wearer's ear (e.g., the auricle) will push against the bone conduction speaker, such that the second end of the member is pushed back towards the side arm (possibly being pressed flush against the sidearm). In this manner, the spring mechanism and member may combine to form a flexible ear-piece, such that when the glasses-style device is worn, the bone-conduction speaker is comfortably pressed against the back of the wearer's ear.

The placement of the bone-conduction speaker against the back of a wearer's auricle may provide for higher sound quality/fidelity. Further, this placement may be much more discrete, and therefore more socially and aesthetically desirable.

Furthermore, in practice, placement of the bone-conduction speaker against the back of a wearer's auricle has been found to produce sound quality that is at least equal to when a bone-conduction speaker is placed against a wearer in front of the wearer's tragus. While placement of a bone-conduction speaker in front of the tragus is popular, this placement may not be socially and/or aesthetically desirable, as it is less discrete than placement behind the auricle. Thus, placement behind the auricle may be more desirable than placement in front of the tragus.

II. Exemplary Wearable Computing Devices

Systems and devices in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

Figure 1A:
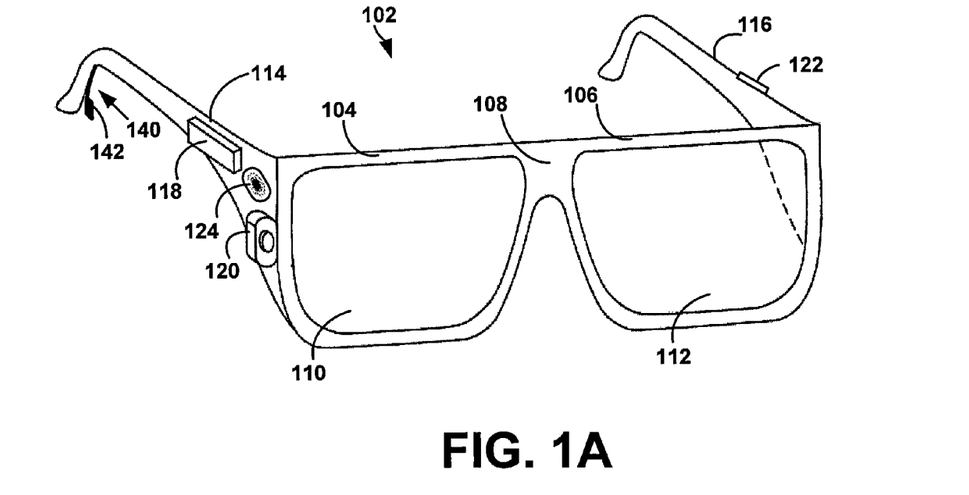
FIG. 1A illustrates a wearable computing system according to an exemplary embodiment.

FIG. 1A illustrates a wearable computing system according to an exemplary embodiment. In FIG. 1A, the wearable computing system takes the form of a head-mounted device (HMD) 102 (which may also be referred to as a head-mounted display). It should be understood, however, that exemplary systems and devices may take the form of or be implemented within or in association with other types of devices, without departing from the scope of the invention. As illustrated in FIG. 1A, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the HMD 102 may connect to or be affixed within a head-mounted helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, an ear-piece 140 is attached to the right side-arm 114. The ear-piece 140 includes a bone-conduction speaker 142, which may be arranged such that when the HMD 102 is worn, the bone-conduction speaker 142 is positioned to the posterior of the wearer's ear. Further, the ear-piece 140 may be moveable such that the bone-conduction speaker 142 can contact the back of the wearer's ear. For instance, in an exemplary embodiment, the ear-piece may be configured such that the bone-conduction speaker 142 can contact the auricle of the wearer's ear. Other arrangements of ear-piece 140 are also possible.

In an exemplary embodiment, a bone-conduction speaker, such as speaker 142, may take various forms. For instance, a bone-conduction speaker may be implemented with a vibration transducer that is configured as a bone-conduction transducer (BCT). However, it should be understood that any component that is arranged to vibrate a wearer's bone structure may be incorporated as a bone-conduction speaker, without departing from the scope of the invention.

Yet further, HMD 102 may include at least one audio source (not shown) that is configured to provide an audio signal that drives bone-conduction speaker 142. For instance, in an exemplary embodiment, an HMD may include a microphone, an internal audio playback device such as an on-board computing system that is configured to play digital audio files, and/or an audio interface to an auxiliary audio playback device, such as a portable digital audio player, smartphone, home stereo, car stereo, and/or personal computer. The interface to an auxiliary audio playback device may be a tip, ring, sleeve (TRS) connector, or may take another form. Other audio sources and/or audio interfaces are also possible.

Figure 1B:
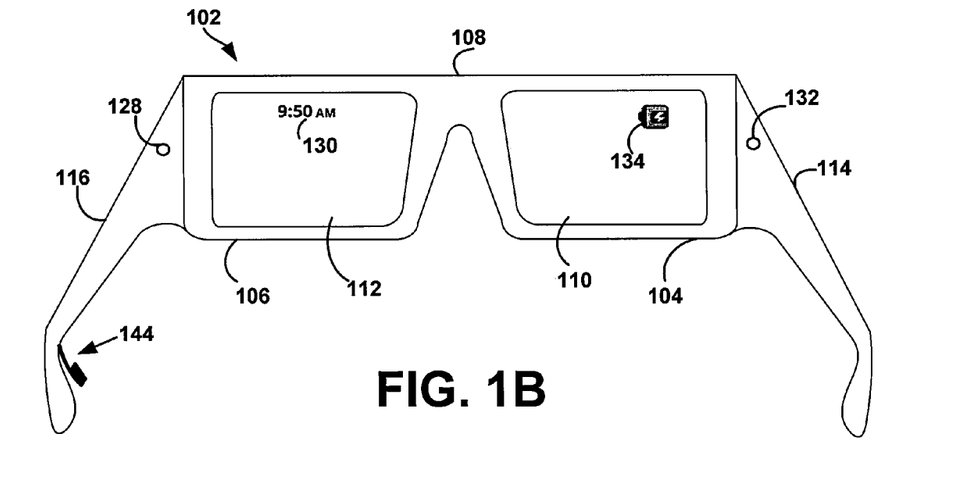
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

In a further aspect, HMD 108 does not include an ear-piece 140 on right side-arm 114. Instead, HMD includes a similarly configured ear-piece 144 on the left side-arm 116, which includes a bone-conduction speaker configured to transfer vibration to the wearer via the back of the wearer's ear.

Figure 1C:
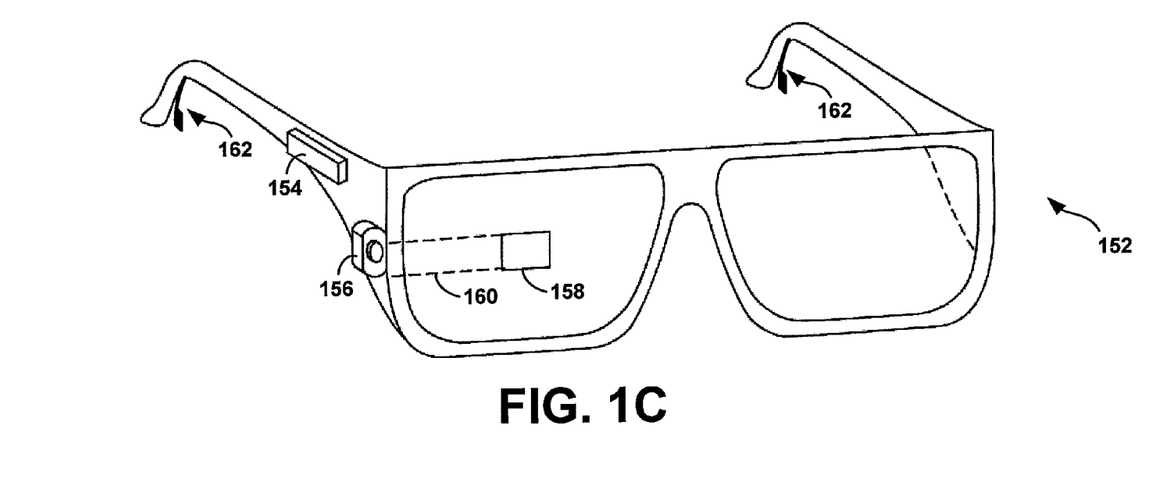
FIG. 1C illustrates another wearable computing system according to an exemplary embodiment.

FIG. 1C illustrates another wearable computing system according to an exemplary embodiment, which takes the form of an HMD 152. The HMD 152 may include frame elements and side-arms such as those described with respect to FIGS. 1A and 1B. The HMD 152 may additionally include an on-board computing system 154 and a video camera 156, such as those described with respect to FIGS. 1A and 1B. The video camera 156 is shown mounted on a frame of the HMD 152. However, the video camera 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

In a further aspect, HMD 152 includes two ear-pieces 162 with bone-conduction speakers, located on the left and right side-arms of HMD 152. The ear-pieces 162 may be configured in a similar manner as ear-pieces 140 and 144. In particular, each ear-piece 162 includes a bone-conduction speaker that is arranged such that when the HMD 152 is worn, the bone-conduction speaker is positioned to the posterior of the wearer's ear. Further, each ear-piece 162 may be moveable such that the bone-conduction speaker can contact the back of the respective ear.

Further, in an embodiment with two ear-pieces 162, the ear-pieces may be configured to provide stereo audio. As such, HMD 152 may include at least one audio source (not shown) that is configured to provide stereo audio signals that drive the bone-conduction speakers 162.

Figure 1D:
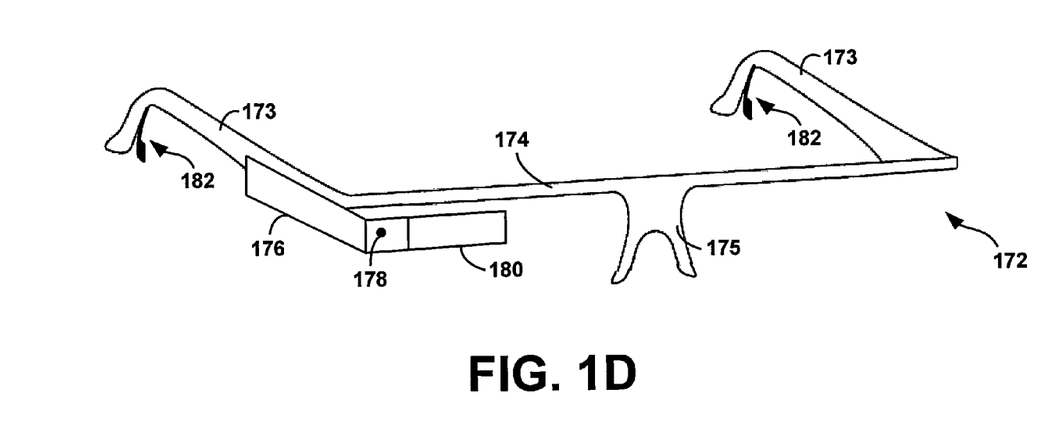
FIG. 1D illustrates another wearable computing system according to an exemplary embodiment.

FIG. 1D illustrates another wearable computing system according to an exemplary embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

In a further aspect, HMD 172 includes two ear-pieces 182 with bone-conduction speakers, which are respectively located on the left and right side-arms of HMD 152. The ear-pieces 182 may be configured in a similar manner as the ear-pieces 162 on HMD 152.

Figure 2:
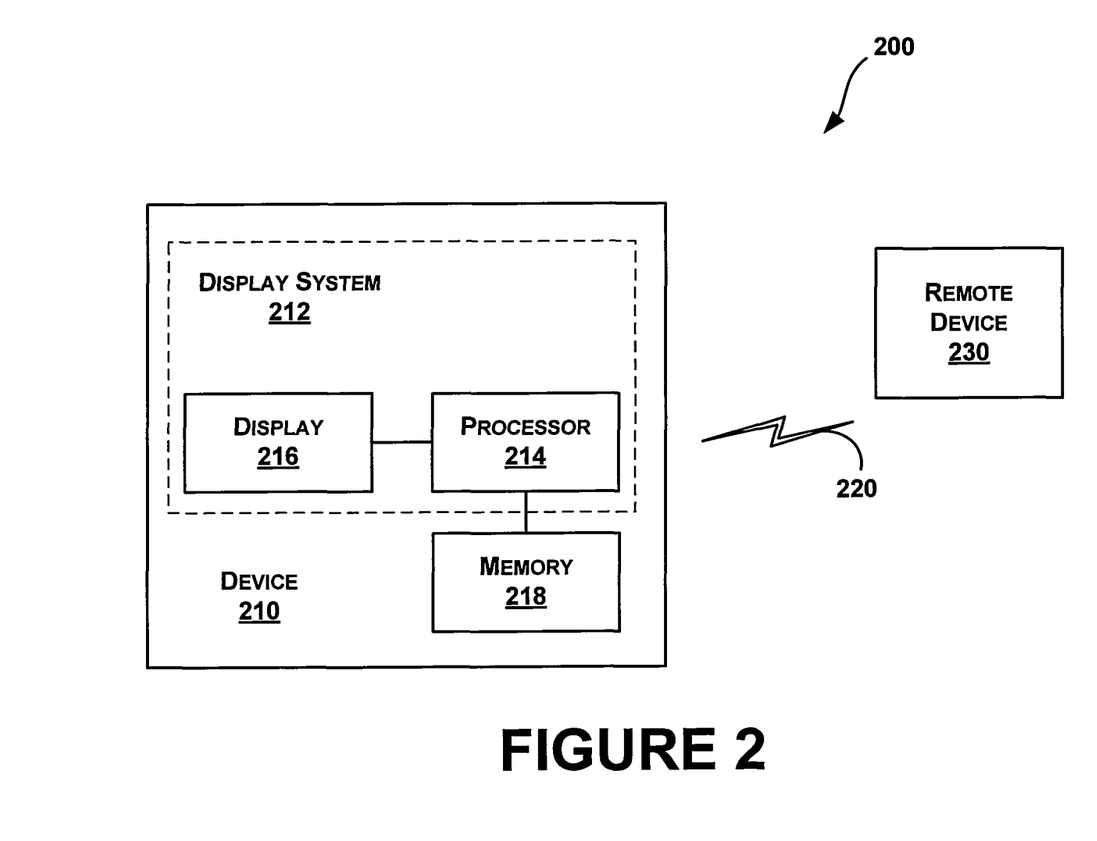
FIG. 2 illustrates a schematic drawing of a computing device according to an exemplary embodiment.

FIG. 2 illustrates a schematic drawing of a computing device according to an exemplary embodiment. In system 200, a device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A-1D.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Exemplary Bone-Conduction Ear-Pieces

A. Exemplary Positioning of Bone-Conduction Speaker

Figure 3:
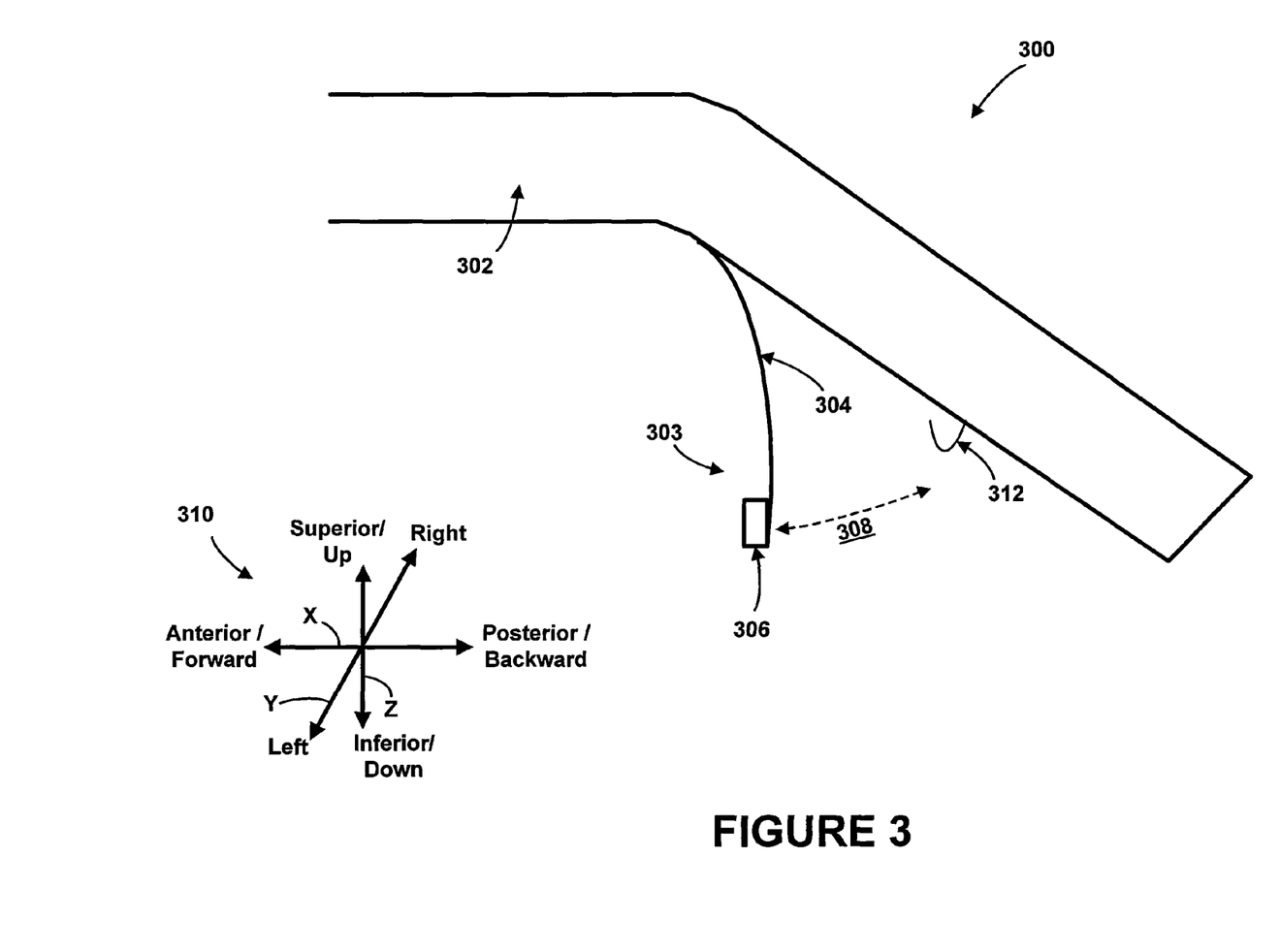
FIG. 3 is a simplified block diagram illustrating an apparatus according to an exemplary embodiment.

FIG. 3 is a simplified block diagram illustrating an apparatus 300 according to an exemplary embodiment. In particular, FIG. 3 shows a portion of a side-arm 302 from a glasses-style support structure. Further, a moveable ear-piece 303 is attached to side-arm 302. The moveable ear-piece 303 is generally formed by a moveable member 304 and a bone-conduction speaker 306. As shown, the proximate end of the moveable member 304 is attached to the support structure. Further, as shown, the bone-conduction speaker 306 is attached at or near the distal end of the moveable member 304.

FIG. 3 illustrates directional axes 310 in order to provide a frame of reference for the movement of moveable ear-piece. In particular, the axes 310 include an x-axis, which generally aligns with the anterior-posterior axis when the glasses-style support structure is worn. As such, forward movement of bone-conduction speaker 306 may be referred to as movement to the anterior and backward movement of bone-conduction speaker 306 may be referred to as movement to the posterior. Axes 310 also include a z-axis, which indicates the general direction of upward and downward movement and generally aligns with the superior-inferior axis when the glasses-style support structure is worn. Further, axes 310 include a y-axis, which indicates the general direction of left and right movement and generally aligns with the medio-lateral axis when the glasses-style support structure is worn.

As further shown, member 304 extends to the anterior of the side-arm 302. Configured as such, when the glasses-style support structure is worn, the distal end of the member 304 positions the bone-conduction speaker 306 to the posterior of the ear. The bone-conduction speaker 306 may be moveable forwards and backwards from the side-arm 302 (i.e., towards and away from the posterior of the ear, respectively) such that when the support structure is worn, the bone-conduction speaker 306 faces a posterior surface of the ear.

More specifically, in an exemplary embodiment, member 304 may be moveable such that the distal end, to which bone conduction speaker 306 is attached, is moveable through arc 308. Note that the range of movement for the bone-conduction speaker along arc 308 may generally have a downward component and a component towards the anterior, and therefore may be generally parallel to a sagittal plane when worn. However, it should be understood that when an exemplary HMD is worn, the movement of the bone conduction speaker might vary from being exactly parallel to the sagittal plane (e.g., having a slight y-axis (left-right) component, in addition to an x-axis (anterior-posterior) component and/or a y-axis (superior-inferior) component), without departing from the scope of the invention.

As such, the member 304 may be configured to position bone-conduction speaker 306 such that bone-conduction speaker 306 contacts the posterior of the ear. Further, in an exemplary embodiment, the member 304 and bone-conduction speaker 306 may be arranged such that the bone-conduction speaker 306 contacts the posterior of the ear at or near the auricle. However, the bone-conduction speaker 306 may contact another posterior surface or surfaces without departing from the scope of the invention.

In some embodiments, ear-piece 303 may be spring-loaded. For instance, a spring-loaded member may be implemented with spring steel. In the illustrated embodiment, member 304 is a curved cantilever spring that tends to return a curved shape. For example, the natural position of member 304 and bone-conduction speaker 306 may be that shown in FIG. 3. Therefore, when a wearer puts on the glasses-style support structure, the back of the ear may contact bone-conduction speaker 306 and cause the member 304 to move to the posterior along an arc 308. Then, when the wearer takes the glasses-style support structure off, member 304 and bone-conduction speaker 306 may return to their natural position.

In an exemplary embodiment, the curvature of member 304 may be such that when the wearer puts the glasses on, the tendency of the cantilever spring to return to its natural curved shape will press the bone-conduction speaker against the posterior of the ear. This scenario is illustrated in FIG. 4.

Figure 4:
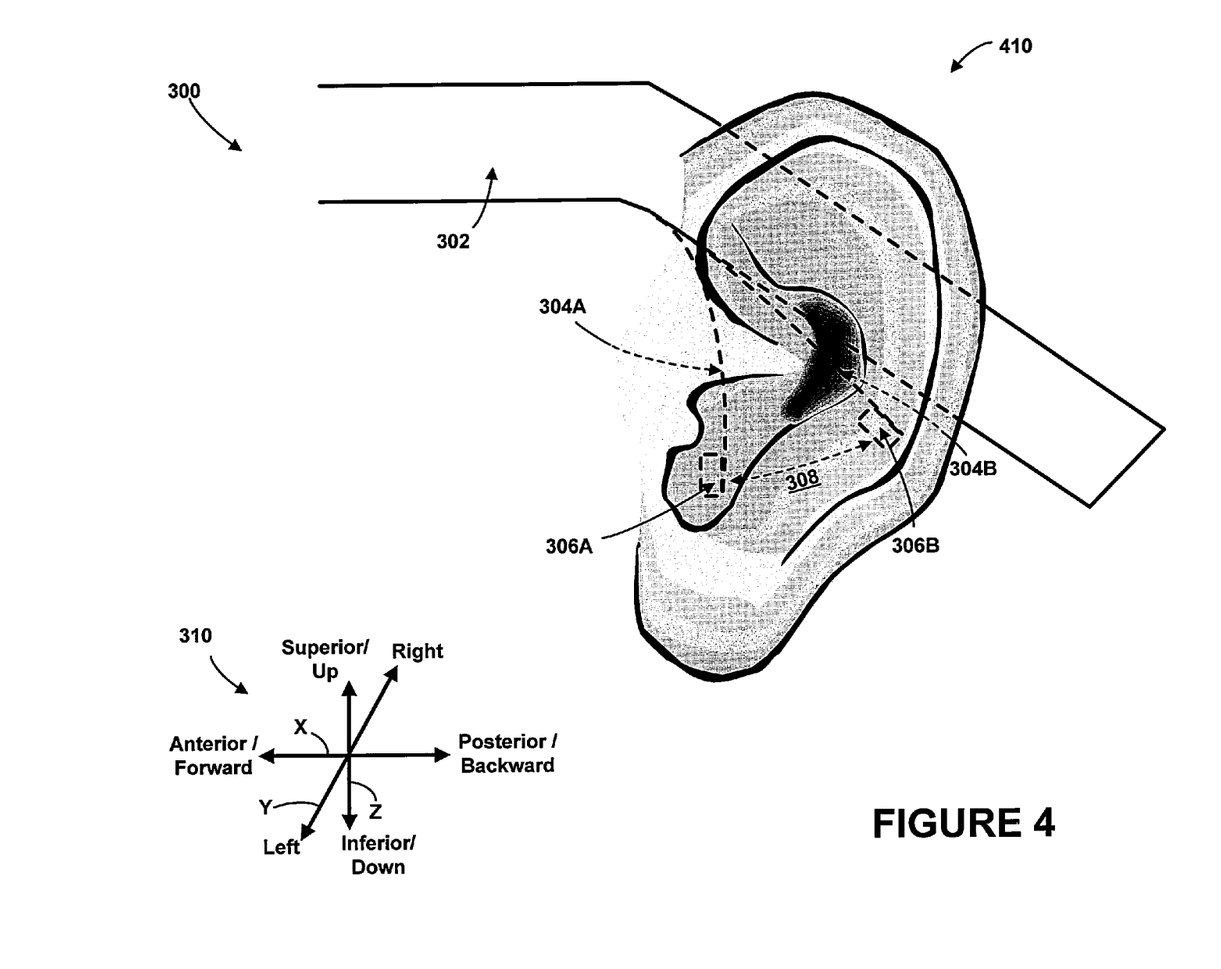
FIG. 4 is a simplified block diagram illustrating the apparatus shown FIG. 3 at a time when the apparatus is being worn, according to an exemplary embodiment.

More specifically, FIG. 4 is a simplified block diagram illustrating the apparatus shown in FIG. 3 at a time when the apparatus is being worn. In FIG. 4, the dotted representation 304A of member 304 illustrates the natural curvature of member 304. Further, the dotted representation 306A of bone-conduction speaker 306 illustrates the natural position of bone-conduction speaker 306.

However, as shown, when the wearer puts the glasses on, the wearer's ear 410 may press against the spring-loaded member 304, moving the bone-conduction speaker 306 posteriorly from its natural position, along arc 308. As such, the ear piece 303 may move posteriorly and/or superiorly, to a position illustrated by the dotted representation 304B of member 304 and the dotted representation 306B of bone-conduction speaker 306.

B. Retractable Bone-Conduction Speakers

In a further aspect of some embodiments, the ear-piece may be retracted to help prevent the bone-conduction speaker from contacting the wearer (note that in practice, whether or not the bone-conduction speaker contacts the wearer may vary due to variations in body shape among wearers). As such, the ear-piece may be retracted when the ear piece is not being used and then deployed when the ear piece is being used. Various mechanisms may be employed to retract and/or deploy the ear-piece.

Figure 5:
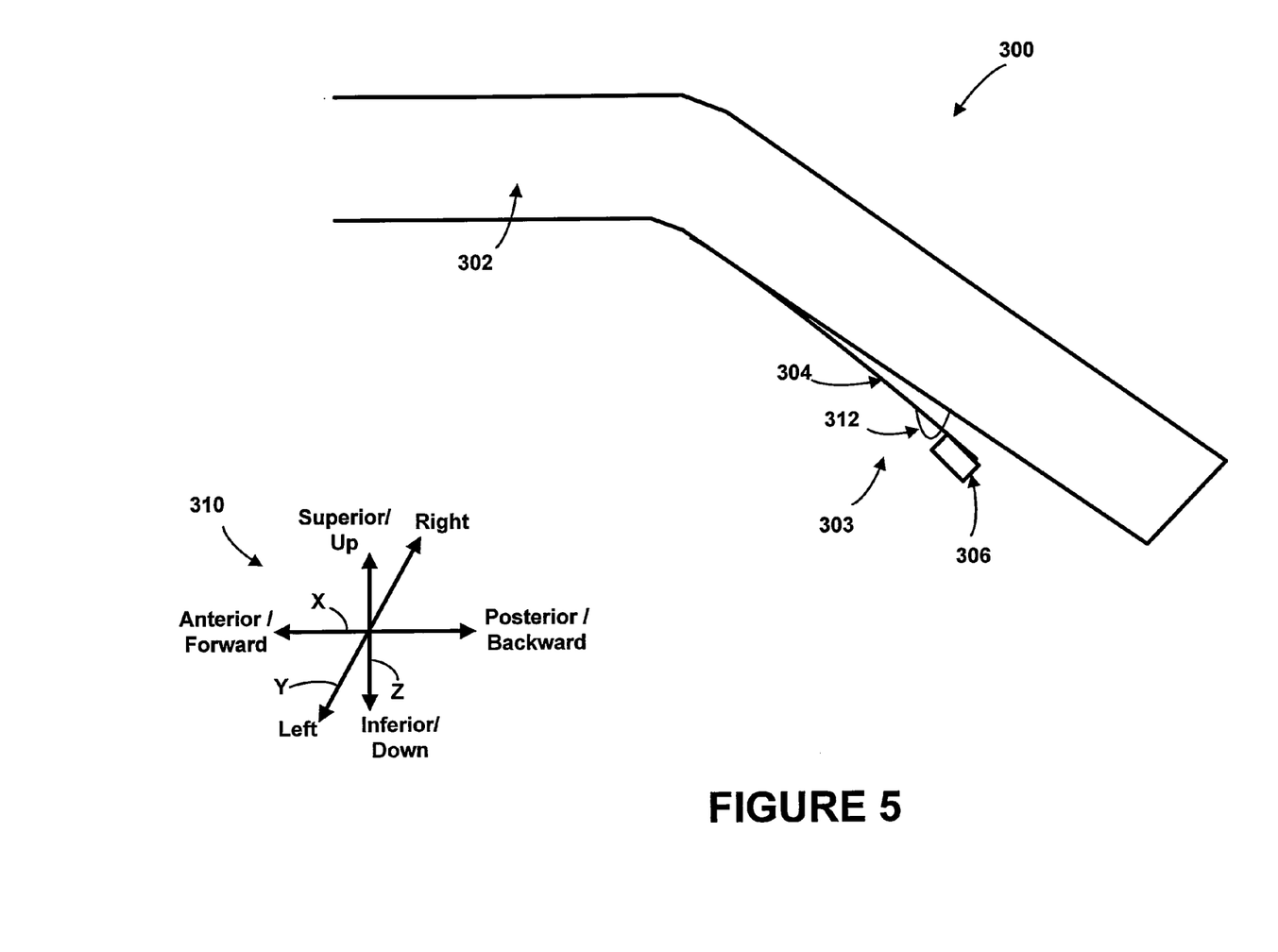
FIG. 5 is a simplified block diagram illustrating the apparatus shown in FIG. 3 at a time when the ear-piece is retracted, according to an exemplary embodiment.

For example, referring back to FIG. 3, an exemplary apparatus may also include a retention mechanism 312, which is configured to hold the ear-piece 303 in a retracted position. FIG. 5 is a simplified block diagram illustrating the apparatus shown in FIG. 3 at a time when the ear-piece is retracted, according to an exemplary embodiment. More specifically, in FIG. 5, the retention mechanism 312 is holding the spring-loaded member 304 substantially flush against a bottom surface of the side-arm 302.

In various embodiments, a retention mechanism 312 and/or other types of retraction systems, which are also configured to hold the ear-piece in a retracted position, may take various forms. For example, the member 304 may be held in place with a switch, a latch, a hook, or possibly even an electromagnet to hold the ear-piece away from the ear. Other types of retention mechanisms are also possible.

Further, the retention mechanisms may require manual action to move ear-piece 303 into a retracted position and/or to release ear-piece 303 from retention mechanism 312. Alternatively, an exemplary apparatus may include a motorized system and/or an electromagnetic system for moving ear-piece 303 into a retracted position and/or releasing ear-piece 303 from retention mechanism 312.

Yet further, the extent to which the ear-piece 303 (e.g., member 304 and bone-conduction speaker 306) can be retracted may vary, depending upon the particular implementation. In the embodiment illustrated in FIGS. 3 to 5, the member 304 is retractable such that when retracted, member 304 is substantially flush against the surface of the side section 302, as shown in FIG. 5. However, the member may not be flush to the support structure when retracted. For example, the member may be retracted just enough to prevent the bone-conduction speaker from contacting the wearer's ear. Other examples of lesser retraction are possible as well. Yet further, in some embodiments the ear-piece may retract to a position in which the ear-piece is wholly or partly within the side-arm. For example, the side-arm may include a cut-out that is sized to allow the member and possibly the bone conduction speaker as well to retract into the cut-out, such that the earpiece is located within the side-arm.

C. Additional Features

In some embodiments, a glasses-style support structure and/or the bone-conduction earpiece may be customizable to fit different users. For example, the distance between where the arm contacts the ear and where the arm connects to a front section of the glasses-style support structure may vary between wearers. However, it may be desirable for glasses to be adjustable so that an exemplary ear piece will fit comfortably behind the ear for most, if not all, people. As such, the size, curvature, and tension of the ear-piece (e.g., the length and/or curvature of member 304) may be adjustable so that a desired fit of the ear piece can be achieved.

Additionally or alternatively, a telescoping side-arm may be incorporated such that the length of the arm of the glasses can be adjusted to a desired fit. In particular, a side-arm on an exemplary glasses-style support structure may include an adjustment system that allows the length of the side-arm to be adjusted along the anterior-posterior axis.

In a further aspect, in order to enhance the comfort of an exemplary embodiment a pad may be placed over and/or around the bone-conduction speaker 306. The pad may be arranged such that when the glasses-style support structure is worn, the pad may be located between the bone-conduction speaker 306 and a posterior surface of the ear. In particular, the pad may be configured to contact the back of the ear (e.g., at the auricle) and in so doing, separate the bone-conduction speaker from the wearer while still transferring vibration from the speaker to the bone structure of the wearer. Such a pad may be made from various materials or combinations of materials. For instance, a pad may be made of plastic, silicon, rubber, and/or foam, among other materials. More generally, a pad may be constructed from any material suitable for providing a comfortable fit, while at the same time transferring an acceptable amount of the vibration from the bone-conduction speaker to the wearer's bone structure.

While the embodiments illustrated herein generally involve ear-pieces that each include a single bone-conduction speaker, some embodiments may include an ear-piece with two or more bone-conduction speakers. Including two or more bone-conduction speakers on a single ear-piece may help to increase volume performance and/or audio quality.

In a further aspect, a bone-conduction speaker may take the form of a vibration transducer that, in addition to transferring audio to the wearer, is configured as an induction power source that wirelessly charges the wearable computing device (or systems thereof).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus comprising:
   a glasses-style support structure comprising a front section and at least one side section;
   at least one bone-conduction speaker; and
   a member having a proximate end and a distal end, wherein the proximate end is attached to the at least one side section, and wherein the at least one bone-conduction speaker is attached to the member at or near the distal end;
   wherein the member is coupled to the at least one side section such that when the glasses-style support structure is worn the member: (a) extends to the anterior of the at least one side section, (b) locates the bone-conduction speaker at a location posterior to an ear, and (c) exerts a force on the bone-conduction speaker towards the posterior surface of the ear;
   wherein the proximate end of the member is coupled to the at least one side section at a coupling location such that when the glasses-style support structure is worn the coupling location is anterior to the location of the bone-conduction speaker.

2. The apparatus of claim 1, wherein the glasses-style support structure is configured to support a head-mountable device.

3. The apparatus of claim 1, wherein the member is arranged on the at least one side section such that when the glasses-style support structure is worn the bone-conduction speaker attached at the distal end of the member faces the posterior surface of the ear.

4. The apparatus of claim 1, wherein the member is moveable such that when the glasses-style support structure is worn the bone-conduction speaker attached at or near the distal end of the member is generally moveable along an anterior-posterior axis towards and away from the posterior surface of the ear.

5. The apparatus of claim 1, wherein the member is moveable such that when the glasses-style support structure is worn the bone-conduction speaker attached at or near the distal end of the member is configured for movement towards and away from the posterior surface of the ear wherein the movement has a component along an anterior-posterior axis and a component along an inferior-superior axis.

6. The apparatus of claim 1, wherein the member is moveable such that the bone-conduction speaker attached at the distal end of the member is anteriorly moveable towards the posterior surface of the ear.

7. The apparatus of claim 1, further comprising a retention mechanism attached to the at least one side section, wherein the retention mechanism is configured to hold the member in a retracted position.

8. The apparatus of claim 1, wherein the member and the bone-conduction speaker collectively provide a spring-loaded bone conduction speaker.

9. The apparatus of claim 1, further comprising a retraction system, wherein the member is moveable such that the bone-conduction speaker is retractable.

10. The apparatus of claim 9, wherein the retraction system comprises at least one of: (a) a spring, (b) a switch, (c) a latch, and (d) a hook.

11. The apparatus of claim 9, wherein the retraction system comprises a motorized retraction system configured to move the member into a retracted position.

12. The apparatus of claim 9, wherein the retraction system comprises an electromagnetic retraction system configured to move the member into a retracted position.

13. The apparatus of claim 9, wherein the member is substantially flush with the side section when retracted.

14. The apparatus of claim 9, wherein the member is substantially embedded within the side section when retracted.

15. The apparatus of claim 1, further comprising one or more additional bone-conduction speakers arranged on the member to face one or more posterior surfaces of the ear.

16. The apparatus of claim 1, wherein the at least one side section comprises a first side section, wherein the member is a first member, and wherein the bone-conduction speaker is a first bone-conduction speaker, the apparatus further comprising:

a second side action of the glasses-style support structure;
a second bone-conduction speaker; and
a second member having a proximate end and a distal end, wherein the proximate end of the second member is attached to the second side section, and wherein the second bone-conduction speaker is attached to the second member at or near the distal end;
wherein the second member is arranged on the second side section such that when the glasses-style support structure is worn the second member: (a) extends to the anterior of the second side section and (b) locates the bone-conduction speaker posterior to an ear that is opposite the ear that the first bone-conduction speaker is posteriorly located.

17. An apparatus comprising:
at least one bone-conduction speaker; and
a member having a proximate end and a distal end, wherein the proximate end comprises an attachment feature that is configured to attach to a side section of a glasses-style support structure, and wherein the at least one bone-conduction speaker is attached to the member at or near the distal end;
wherein the member is attachable to the side section such that when the glasses-style support structure is worn the member: (a) extends to the anterior of the at least one side section (b) locates the bone-conduction speaker posterior to an ear, and (c) exerts a force on the bone-conduction speaker towards the posterior surface of the ear;
wherein the proximate end of the member is couplable to the at least one side section at a coupling location such that when the glasses-style support structure is worn the coupling location is anterior to the location of the bone-conduction speaker.

18. The apparatus of claim 17, wherein the member is attachable to the side section such that when the glasses-style support structure is worn the bone-conduction speaker attached at the distal end of the member faces a posterior surface of the ear.

19. The apparatus of claim 17, wherein the member is attachable to the side section such that when the glasses-style support structure is worn the bone-conduction speaker attached at or near the distal end of the member is generally moveable along an anterior-posterior axis towards and away from a posterior surface of the ear.

20. The apparatus of claim 17, wherein the member is attachable to the side section such that when the glasses-style support structure is worn the bone-conduction speaker attached at or near the distal end of the member is moveable towards and away from the posterior surface of the ear such that movement of the bone-conduction speaker has a component along an anterior-posterior axis and a component along an inferior-superior axis.

* * * * *